(12) United States Patent
Miyatani et al.

(10) Patent No.: US 6,740,876 B2
(45) Date of Patent: May 25, 2004

(54) SCANNING PROBE MICROSCOPE

(75) Inventors: Tatsuya Miyatani, Chiba (JP); Akira Egawa, Chiba (JP); Kunio Nakajima, Chiba (JP)

(73) Assignee: Seiko Instruments Inc., Chiba (JP)

(*) Notice: Subject to any disclaimer, the term of this patent is extended or adjusted under 35 U.S.C. 154(b) by 0 days.

(21) Appl. No.: 09/966,719

(22) Filed: Sep. 27, 2001

(65) Prior Publication Data

US 2002/0079446 A1 Jun. 27, 2002

(30) Foreign Application Priority Data

Oct. 11, 2000 (JP) ........................................ 2000-310316
Jun. 25, 2001 (JP) ........................................ 2001-191337

(51) Int. Cl.⁷ .............................................. G12B 21/20
(52) U.S. Cl. ....................................................... 250/306
(58) Field of Search ............................. 250/306; 73/105

(56) References Cited

U.S. PATENT DOCUMENTS 5,204,531 A  *  4/1993  Elings et al. ................ 250/306
5,543,614 A  *  8/1996  Miyamoto .................. 250/234
6,189,374 B1 *  2/2001  Adderton et al. ............. 73/105

* cited by examiner

Primary Examiner—Juan R. Lee
Assistant Examiner—Phillip A Johnston
(74) Attorney, Agent, or Firm—Adams & Wilks

(57) ABSTRACT

A scanning probe microscope comprises scanning control means for controlling raster scanning of an XYZ translator, and displacement detection means for detecting amount of displacement of the XYZ translator, and is configured so that of the two raster scanning axes, only displacement of the XYZ translator along a low frequency scanning axis is feedback controlled, displacement of the XYZ translator along a high frequency scanning axis is made larger than a region to be observed, and sampling of an amount of displacement of the XYZ translator starts at the same time as a relative position of a probe enters into the observation region.

27 Claims, 8 Drawing Sheets

SCANNING PROBE MICROSCOPE

BACKGROUND OF THE INVENTION

The present invention relates to a scanning probe microscope.

FIG. 10 is an outline view of an atomic force microscope (AFM), which is one type of scanning probe microscope (SPM) of the related art. In FIG. 10, reference numeral 1001 is an XYZ translator, 1002 is a sample stage, 1003 is a sample, 1004 is a cantilever, 1005 is a cantilever deflection detector, 1006 is a controller, and 1007 is a computer.

In this related art AFM, the sample 1003 is mounted on the sample stage 1002 above the XYZ translator 1001, the sample 1003 is brought into contact with a sharpened probe fixed to the tip of the cantilever 1004, and the sample is scanned in the X-Y plane by the XYZ translator 1001. During this time, deflection of the cantilever is monitored by the deflection detector 1005, the controller 1006 performs feedback control so that deflection is fixed, and the position of the sample 1003 in the Z direction is adjusted by the XYZ translator 1001. Microscopic structures on the sample surface can be observed by mapping adjustment amounts for each position on the surface of the sample onto a screen using a computer.

As has been described for the related art technique, with an SPM the probe performs a raster scan relative to the sample using the XYZ translators. A piezoelectric body is used in many XYZ translators. A piezoelectric body can perform high resolution scanning with extremely small amounts of displacement per unit of applied voltage. On the other hand, however, because a voltage displacement curve of the piezoelectric body exhibits hysteresis, and is not linear, and because creep and drift arise, the shape of a scanning region is distorted and measurement accuracy is reduced.

FIG. 11 shows operation of the related art SPM, with reference numeral 1101 being an intended observation region, and 1102 being an actually observed region. Reference numerals 1103 and 1104 respectively represent a high scanning frequency axis and a low scanning frequency axis of the raster scanning. Putting it simply, in the case where an appropriate voltage is applied to a region 1101 obtained from a displacement amount per unit of voltage and scanned, the actually scanned region is distorted as shown by 1102 due to initial hysteresis etc., and reduced accuracy is caused because an observation image is generated with this as the region 1101.

With current SPMs, it is common to use a linear rise method where amounts of hysteresis and creep etc. are measured beforehand, a time voltage Curve is obtained so that amount of displacement of the XYZ translator becomes linear with respect to time, and a voltage based on this curve is applied to remove the effects of hysteresis etc.

Also, methods are being considered where amount of displacement of the XYZ translator is measured using a displacement sensor, and an image is generated based on this amount of displacement. Methods are also being considered where amount of displacement of the XYZ translator is measured using a displacement sensor, and scanning is performed while carrying out feedback control based on this amount of displacement.

However, with the linear rise method, there is the disadvantage that operation also varies with deterioration with age of the XYZ translator and changes in scanning frequency, and accuracy is reduced. Also, with the method of generating an image based on displacement sensor values, there is the drawback that the amount of data and computation required to generate the image is enormous. With the method of carrying out feedback control, there is the problem that scanning frequency is limited by the processing speed of the control system.

The object of the present invention is to solve the above described problems in a scanning probe microscope, and aims to provide a high precision scanning probe microscope that is not subject to the influence of hysteresis of a piezoelectric element or deterioration with age, reduces the amount of data and computation required to generate an image, and is capable of expanding the scanning frequency band limits.

SUMMARY OF THE INVENTION

In order to achieve the above described object, a scanning probe microscope of the present invention comprises scanning control means for controlling raster scanning of an XYZ translator, and displacement detection means for detecting amount of displacement of the XYZ translator, and is configured so that of the two raster scanning axes, only displacement of the XYZ translator along a low frequency scanning axis is feedback controlled, displacement of the XYZ translator along a high frequency scanning axis is made larger than a region to be observed, and an amount of displacement of the XYZ translator is sampled at the same time as a relative position of a probe enters into the observation region.

With this configuration, the effects of hysteresis or deterioration of the translator with age are removed, the amount of data and computation at the time of image generation is reduced, it is possible to make the scanning frequency high without raising the bandwidth of the control system, and it is possible to provide a high precision observation image with no distortion.

DETAILED DESCRIPTION OF THE INVENTION

The following is a description, based on the drawings, of preferred embodiments of the present invention.

[First Embodiment]

Figure 1:
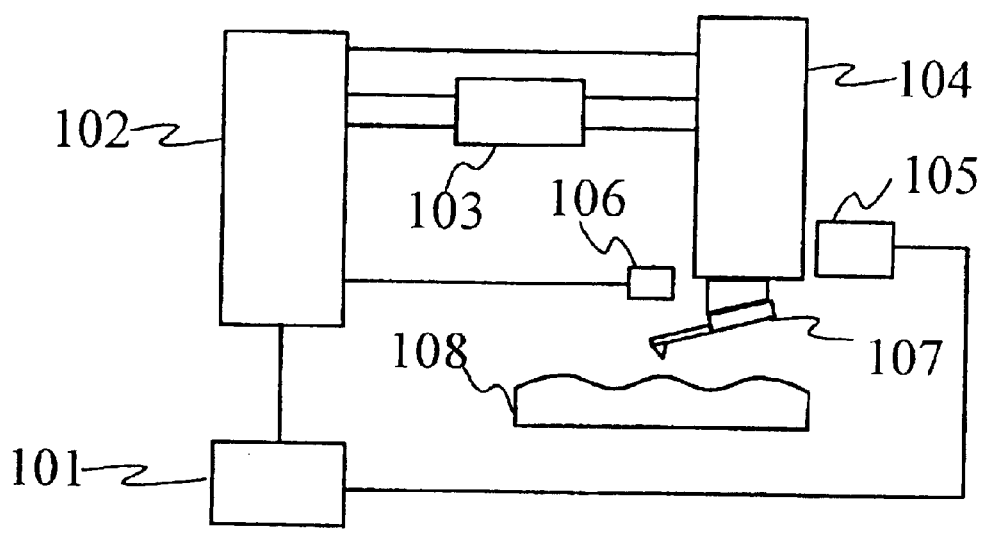
FIG. 1 is an explanatory diagram of a scanning probe microscope of the first embodiment of the present invention.

FIG. 1 is a schematic diagram of a scanning probe microscope of the present invention. The scanning probe microscope is mainly made up of a computer 101, an SPM controller 102, a scanning controller 103, an XYZ translator 104, an XYZ displacement detector 105, a deflection detector 106, a cantilever 107, and a sample 108. The scanning controller 103 controls a voltage to be applied to the XYZ translator 104 in order to cause raster scanning of the probe relatively on the sample surface. The XYZ displacement detection means 105 simultaneously detects amounts of displacement of the XYZ translator 104 in the three X, Y and Z directions, and saves results in a storage device. With this structure, it is possible to generate a high precision image based on displacement amounts for the XYZ translator 104 obtained using the XYZ displacement detector 105. It is also possible to obtain a high precision image by feedback control of the raster scanning.

With this embodiment, description has been given for a structure where a cantilever is fixed to the XYZ translator, and the sample surface is raster scanned, but the same effects are also obtained with a structure where the sample is fixed to the XYZ translator and a probe is raster scanned on the sample surface by moving the sample.

[Second Embodiment]

Figure 2:
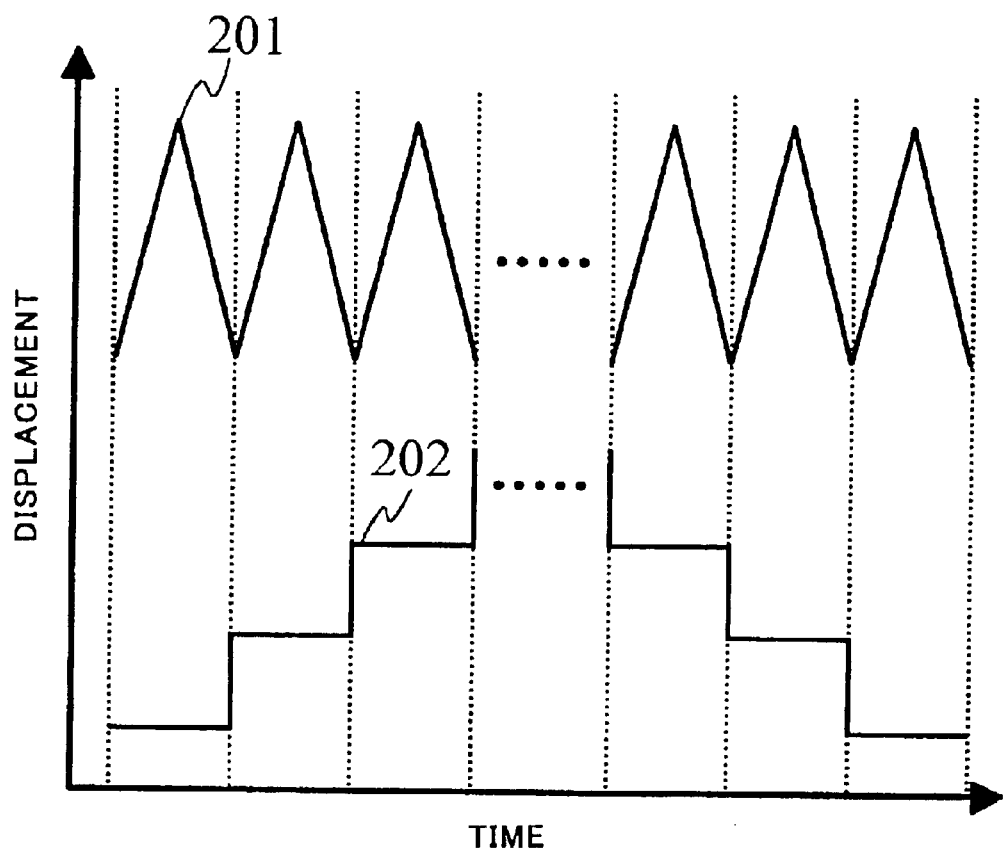
FIG. 2 is an explanatory diagram relating to operation of a scanning probe microscope of the second embodiment of the present invention.

FIG. 2 shows variations with time of the amount of relative displacement 201 of the probe in the direction of a high frequency scanning axis of the raster scanning axes with respect to the simple, and amount of relative displacement 202 of the probe in the direction of a low frequency scanning axis with respect to the sample. The amount of displacement of the probe in the direction of the low scanning frequency axis is kept constant by feedback control during one period of the high frequency scanning axis, and is increased by a fixed amount each period. With this type of structure, since it is possible to remove the effects due to creep and drift in the direction of the low frequency scanning axis, the data required to generate an image is made up of relative displacement of the probe in the direction of the high frequency scanning axis and relative displacement amount of the probe in a Z direction representing the sample height, which are obtained simply through interpolation of data for the high frequency scanning axis, making it possible to reduce the amount of data and computation. It is also possible to carry out high speed scanning by performing feedback control only in the direction of the low frequency scanning axis.

Figure 3:
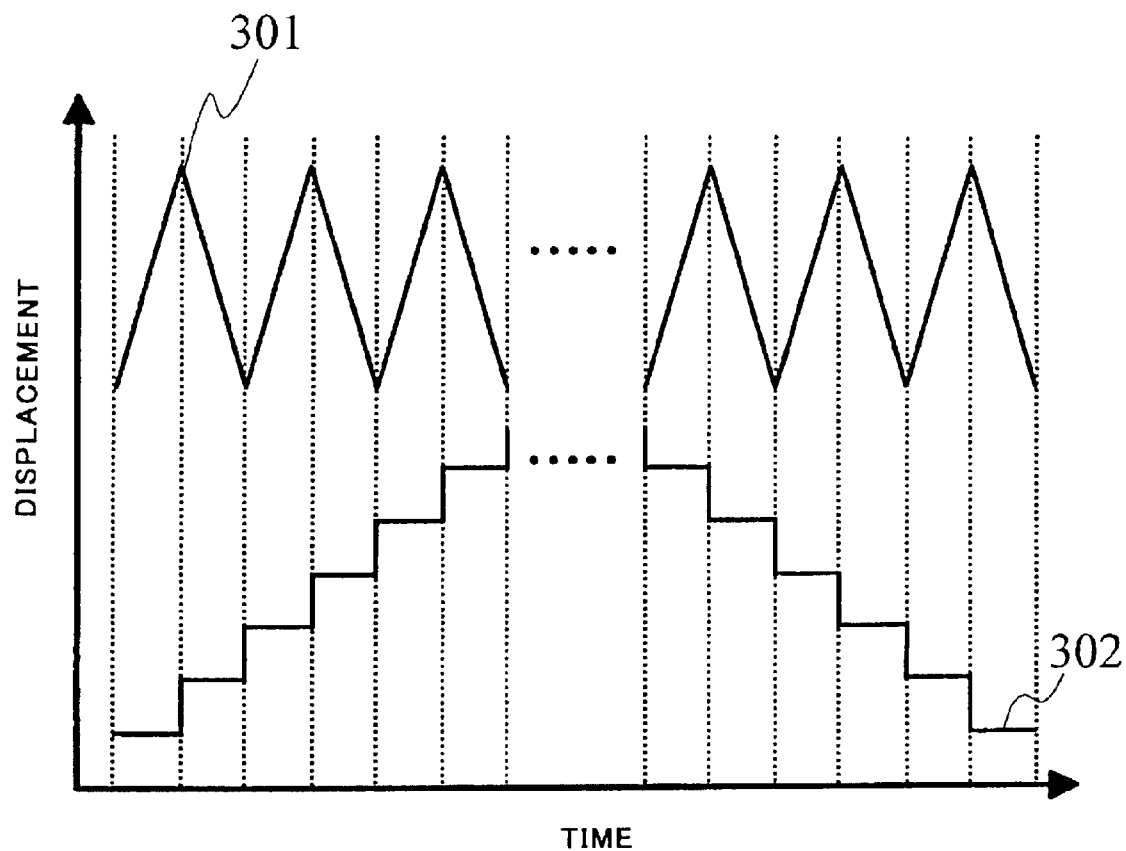
FIG. 3 is an explanatory diagram relating to operation of a scanning probe microscope of the second embodiment of the present invention.

As shown in FIG. 3, it is also possible to bring about a 50% reduction in the time taken to raster scan without changing the frequency of the high frequency scanning axis, by increasing the amount of displacement 302 in the direction of the low frequency scanning axis by a fixed amount each half period of the displacement 301 in the direction of the high frequency scanning axis.

[Third Embodiment]

Figure 4:
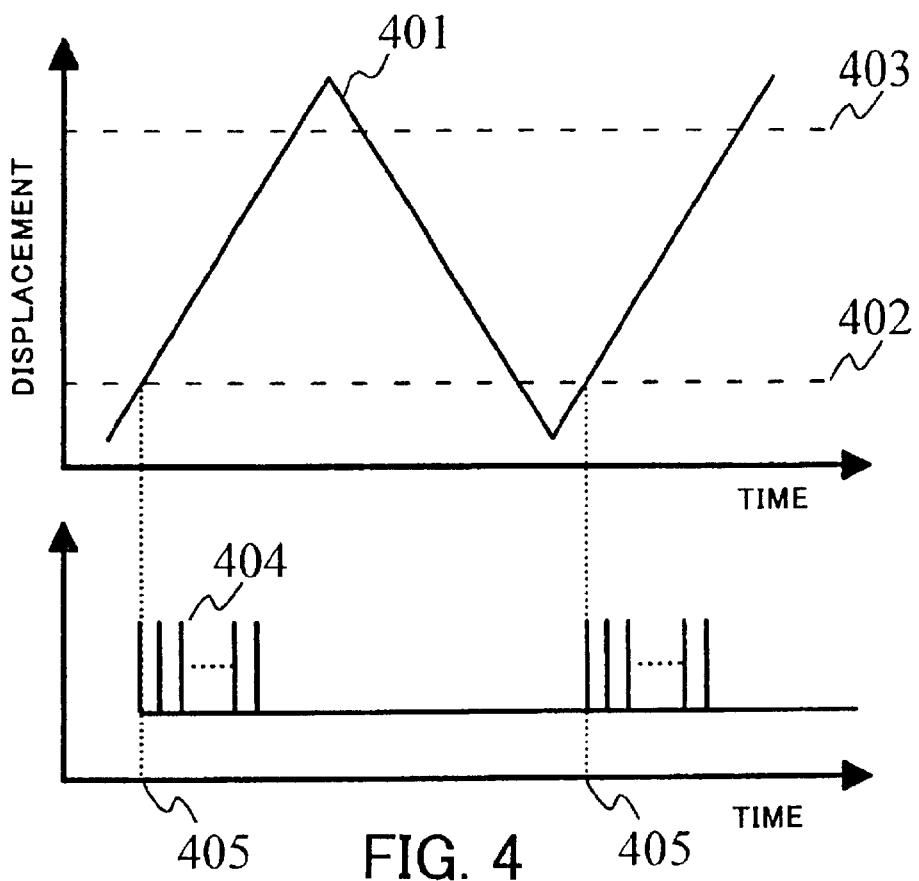
FIG. 4 is an explanatory diagram relating to operation of a scanning probe microscope of the third embodiment of the present invention.

FIG. 4 shows change over time of relative displacement amount 401 of the probe in the direction of the high frequency scanning axis, and sampling pulses 404 representing the timing at which the XYZ displacement detector 105 samples relative displacement amount of the probe in order to generate an image.

A scanning controller 103 ensures that scanning is performed so that an amount of relative displacement of the probe in the direction of the high frequency scanning axis becomes larger than from the region 402 to be observed to 403. The XYZ displacement detector 105 starts sampling an amount of relative displacement of the probe in order to generate an image from a point in time 405 when the amount of relative displacement of the probe in the direction of the high frequency axis enters the regions to be observed. With such an arrangement, it is possible to avoid the region of the image becoming narrower than the region to be observed when generating an image based on amount of relative displacement of the probe.

[Fourth Embodiment]

Figure 5:
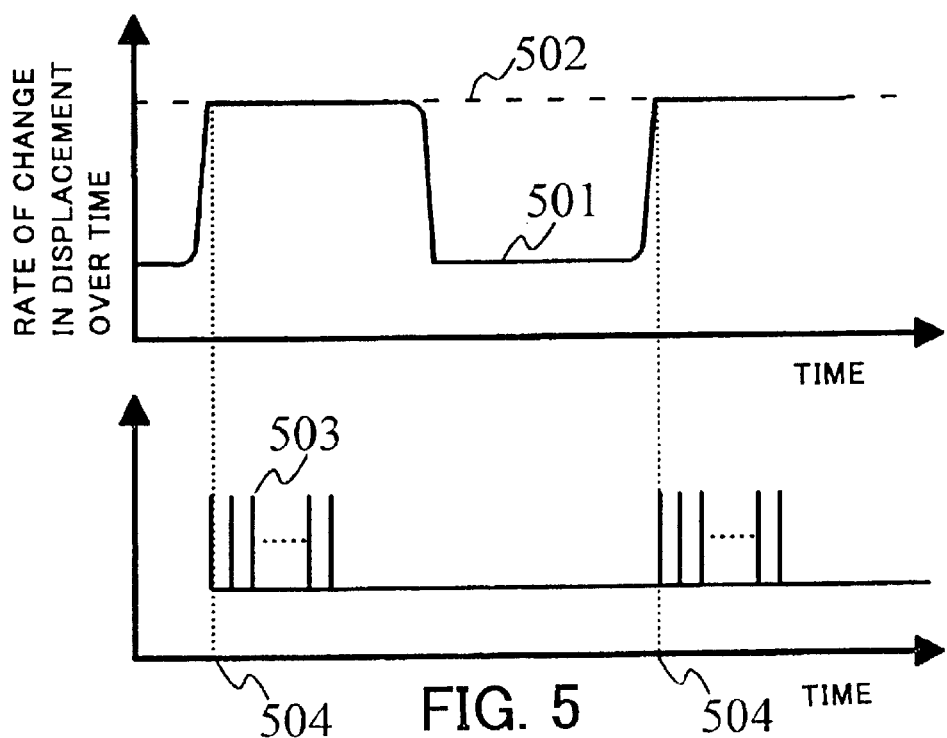
FIG. 5 is an explanatory diagram relating to operation of a scanning probe microscope of the fourth embodiment of the present invention.

FIG. 5 shows a rate of change over time of relative displacement amount 501 of the probe in the direction of the high frequency scanning axis, and sampling pulses 503 representing the timing at which the XYZ displacement detector 105 samples relative displacement amount of the probe in order to generate an image.

The X YZ displacement detector 105 starts sampling an amount of relative displacement of the probe in order to generate an image from a point in time 504 when a rate of change over time of the amount of relative displacement of the probe in the direction of the high frequency axis becomes constant. With such a structure, sampling data for an amount of relative displacement of the probe in the direction of the high frequency scanning axis becomes constant intervals with respect to distance, and it is possible to generate a high precision image without performing interpolation calculations for the high frequency scanning axis direction.

[Fifth Embodiment]

Figure 6:
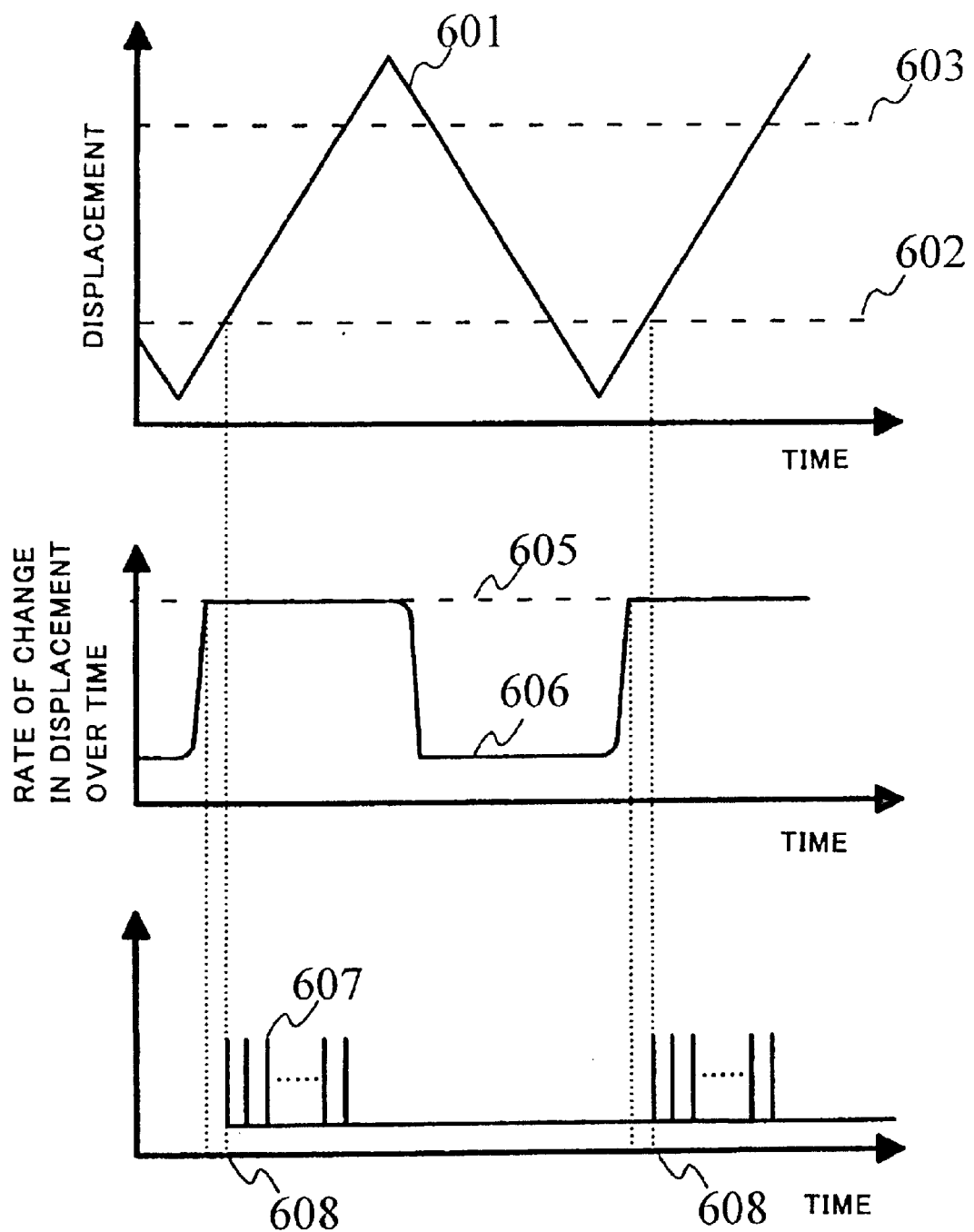
FIG. 6 is an explanatory diagram relating to operation of a scanning probe microscope of the fifth embodiment of the present invention.

FIG. 6 shows relative displacement amount 601 of the probe in the direction of the high frequency scanning axis, a rate of change over time 606 of this relative displacement amount, and sampling pulses 607 representing the timing at which the XYZ displacement detector 105 samples relative displacement amount of the probe in order to generate an image.

A scanning controller 103 makes the displacement amount large so that the rate of change over time 606 becomes constant before an amount of relative displacement of the probe in the direction of the high frequency scanning axis enters a region from the region to be observed 602 to 603. Alternatively feedback control is carried out so that the rate of change over time 606 becomes constant before an amount of relative displacement of the probe in the direction of the high frequency scanning axis centers a region from the region to be observed 602 to 603. The XYZ displacement detector 105 starts sampling an amount of relative displacement of the probe in order to generate an image from a point in time 608 when the amount of relative displacement of the probe in the direction of the thigh frequency axis enters into the region to be observed. With such a stricture, it is possible to generate a high precision image of a region to be observed without performing interpolation calculations for the high frequency scanning axis direction.

[Sixth Embodiment]

Figure 7:
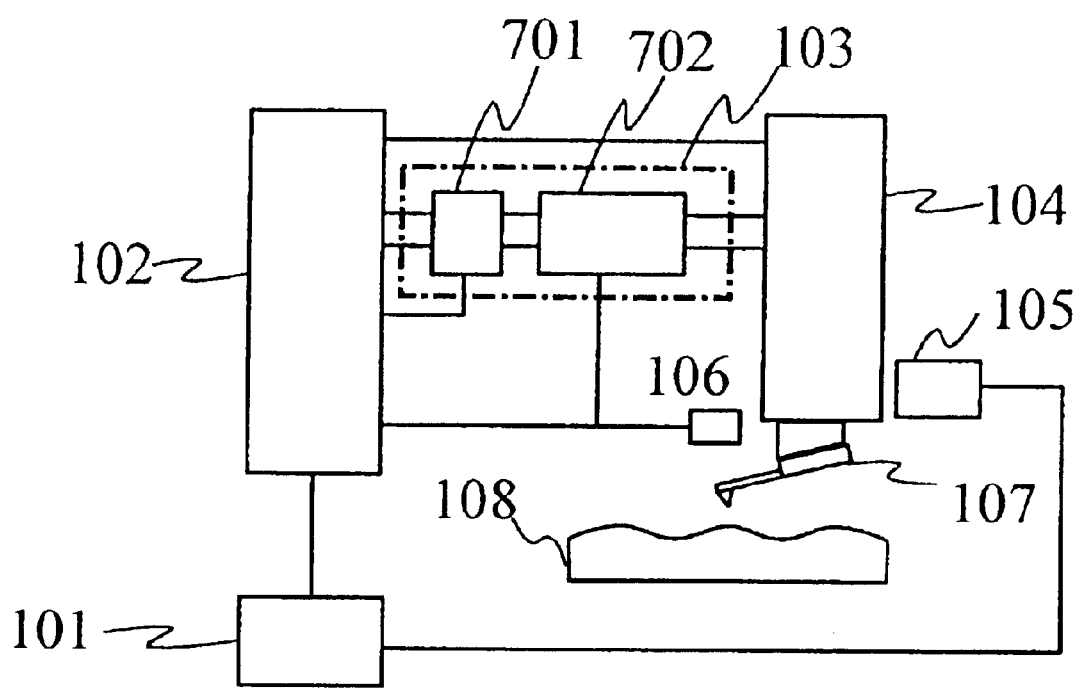
FIG. 7 is a schematic view of a scanning probe microscope of the related art.

FIG. 7 is a schematic diagram of a scanning probe microscope of the present invention. The scanning probe microscope is mainly made up) of a computer 101, ail SPM controller 102, a scanning controller 103, an XYZ translator 104, an XYZ displacement detector 105, a deflection detector 106, a cantilever 107, and a sample 108, and reference numeral 701 is sampling pulse generating means while reference numeral 702 is scanning speed adjustment means.

Figure 8:
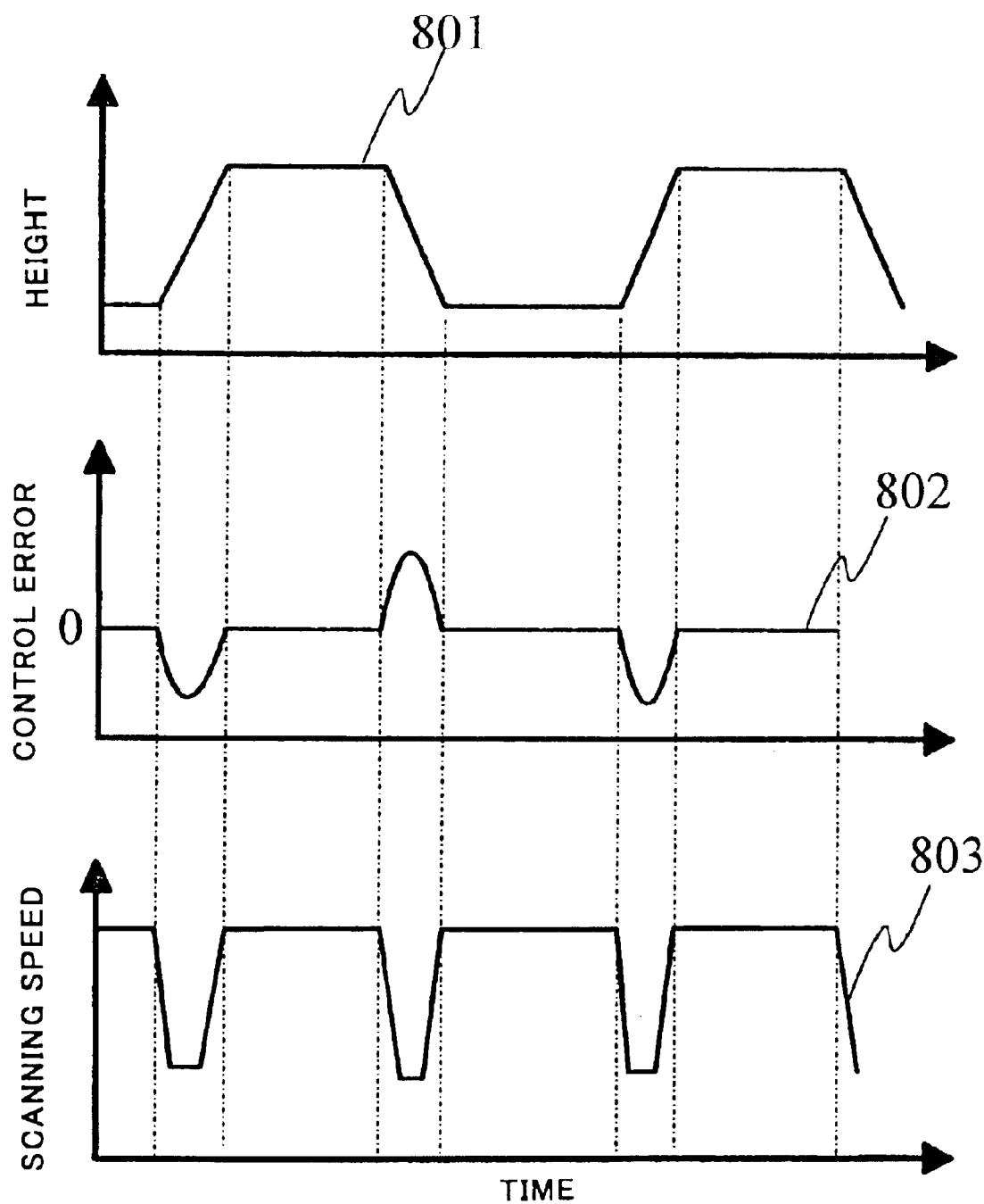
FIG. 8 is an explanatory diagram relating to operation of a scanning probe microscope of the related art.

In FIG. 8, reference numeral 801 schematically represents the cross sectional form of a sample traced by the AFM probe, 802 represents an error signal in the case of the probe having traced the cross sectional form 801, and 803 represents a scanning speed curve when the probe is tracing the cross sectional form 801.

Figure 9:
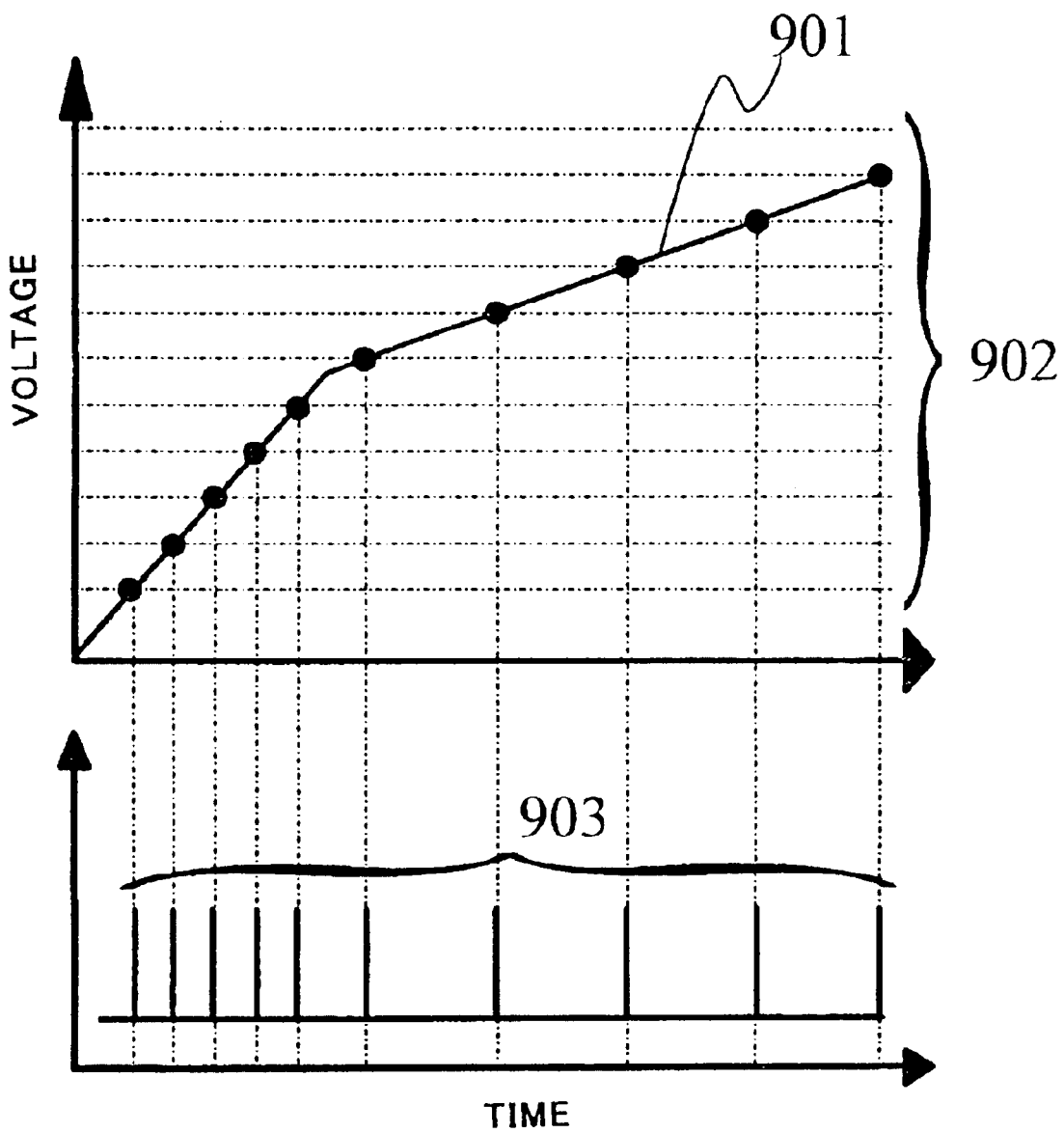
FIG. 9 is a drawing showing the timing at which the sampling pulse generating means 701 generates sampling pulses.
Figure 10:
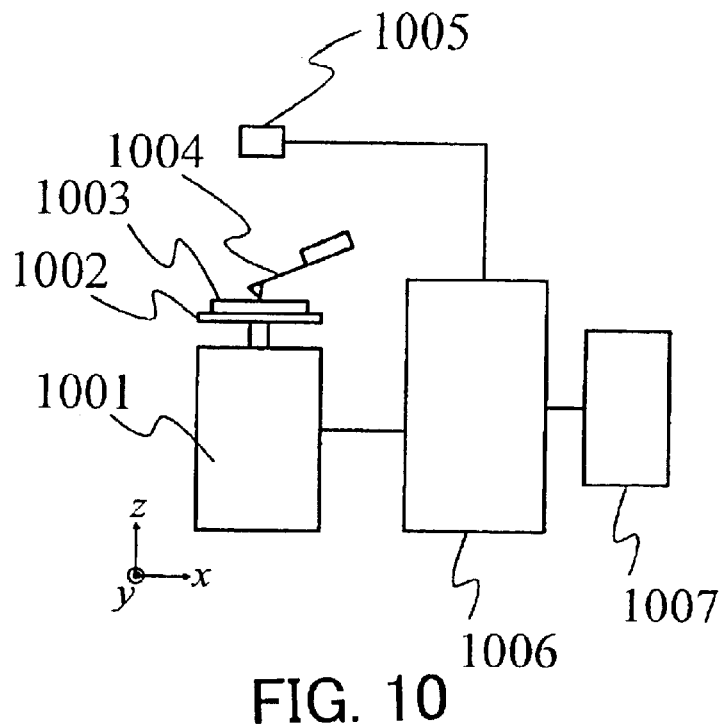
FIG. 10 is an outline view of an atomic force microscope (AFM), being one type of scanning probe microscope (SPM), of the related art.
Figure 11:
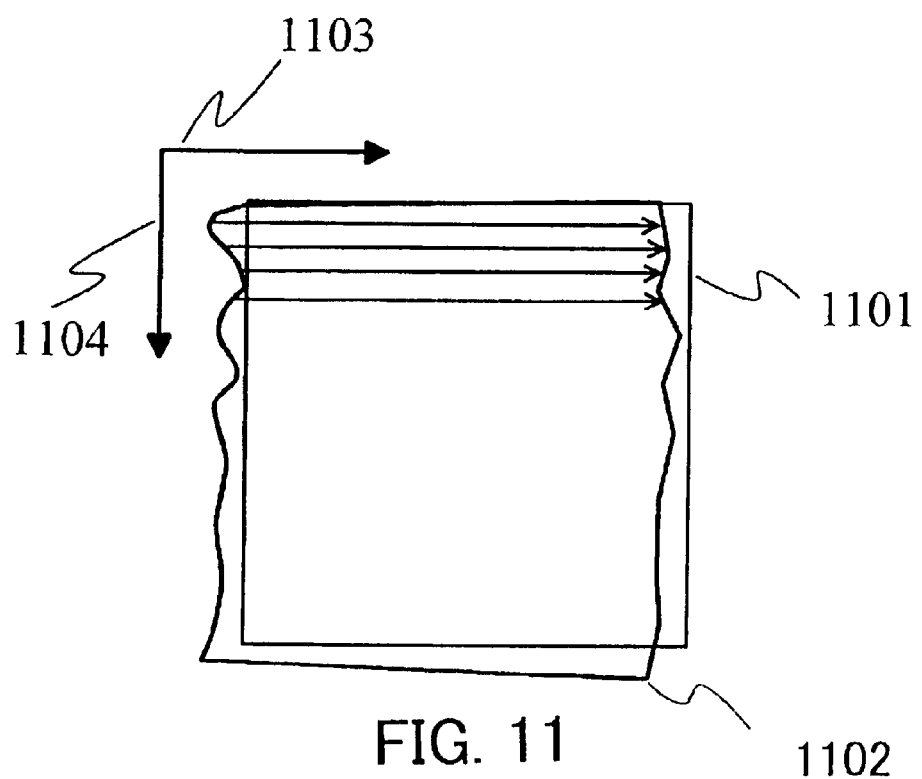
FIG. 11 is a drawing showing operation of the SPM of the related art.

FIG. 9 shows the timing at which the sampling pulse generating means generates sampling pulses, and reference numerals 901, 902 and 903 are respectively a scanning voltage curve, thresholds, and sampling pulses for the high frequency scanning axis direction. The thresholds 902 have equal intervals.

The scanning speed adjustment means controls the scanning speed in the direction of the high frequency scanning axis so that the error signal 802 becomes 0. In FIG. 8, the scanning speed curve 803 represents a low scanning speed at the dipped regions, and represents a high scanning speed at regions where there is no dip. In this way, by adjusting the scanning speed based on the error signal, at regions where the dip is slight the scanning speed becomes high, and at regions where the dip is extreme the scanning speed becomes low, which means that as a result it is possible to measure the shape at high speed without sacrificing precision.

The sampling pulse generating means 701 generates sampling pulses every time a scanning voltage foil the high frequency scanning axis direction reaches a set threshold 902, and the computer 101 and the SPM controller 102 then perform sampling necessary to acquire an image using sampling pulses from the sampling pulse generating means 701. At this time, in addition to height information for the sample, relative displacement amount of the probe with respect to the sample is simultaneously obtained from the XYZ displacement detector 105, and it is possible to acquire a high precision image by image generation based on displacement amount.

As has been described above, by sampling shape data using sampling pulses based oil a scanning voltage of a scanner, it is possible to acquire data that have an equal interval with respect to distance, even if the scanning speed varies.

With this embodiment, the sampling pulse generating means 701 generates sampling pulses based on scanning voltage, but by generating sampling pulses based on output of the XYZ displacement detector for the high frequency scanning axis direction it is possible to avoid the effects of scanner drift and hysteresis etc., making it possible to obtain a higher precision image.

In either case, by keeping the scanner displacement in the direction of the low frequency scanning axis constant based on output of the XYZ displacement detector for the low frequency scanning axis direction during one period of the high frequency scanning axis direction, it is possible to obtain a higher precision image.

The scanning probe microscope of the present invention described above his the following features:

a) it comprises a displacement detector for detecting relative position or amount of displacement of a probe with respect to a sample, and a scanning controller for controlling raster scanning of an XYZ translator;

b) relative position or amount displacement of the probe with respect to the sample in the direction of a low frequency scanning axis is kept constant by feedback control during one cycle or a half cycle of the high frequency scanning axis, or is increased by a fixed amount every cycle or half cycle;

c) relative position or amount of displacement of the probe relative to the sample in the direction of the high frequency scanning axis is scanned so as to become bigger than a region to be observed, and sampling of relative position or amount of displacement of the probe relative to the sample in order to generate an image commences at a point in time when the relative position or amount of displacement of the probe with respect to the sample in the direction of the high frequency scanning axis enters into the region to be observed;

d) sampling of relative position or amount of displacement of the probe relative to the sample in order to generate an image commences at a point in time when the rate of change over time of the relative position or amount of displacement of the probe with respect to the sample in the direction of the high frequency scanning axis becomes constant;

e) displacement amount is made sufficiently large to make rate of change over time constant before relative position or amount of displacement of the probe with respect to the sample in the direction of the high frequency scanning axis enters the region to be observed, and sampling of relative position or amount of displacement of the probe relative to the sample in order to generate an image commences at a point in time when the relative position or amount of displacement of the probe with respect to the sample in the direction of the high frequency scanning axis enters into the region to be observed;

f) relative position or amount of displacement of the probe with respect to the sample in the direction of the high frequency scanning axis is feedback controlled so that rate of change over time becomes constant before relative position or displacement of the probe with respect to the sample in the direction of the high frequency scanning axis enters the region to be observed, and sampling of relative position or displacement of the probe in order to generate an image commences at a point in time when the relative position or displacement of the probe with respect to the sample in the direction of the high frequency scanning axis enters into the region to be observed. Thus, without being subject to the effects of hysteresis or deterioration of a piezoelectric body with age, the amount of data and computation in order to generate an image is reduced, it is possible to expand the bandwidth limitations of the scanning frequency, and it is possible to obtain a high precision image.

Also, by having an arrangement where there is a scanning speed control means and the scanning speed is controlled so that control error in the height direction becomes 0, it is possible to scan at high speed without sacrificing precision.

Further, by generating sampling pulses every time a scanning voltage for the high frequency scanning axis direction reaches a previously set threshold, and sampling shape information based on the sampling pulses, it is possible to obtain data that is equally spaced with respect to distance even if there is variation in scanning speed.

What is claimed is:

1. A scanning probe microscope which observes microscopic structures on a sample surface, comprising: a probe responsive to an atomic force generated when brought into close proximity to the sample surface; scanning means for performing raster scanning of the probe along a first scanning axis substantially parallel to the sample surface and a second scanning axis substantially parallel to the sample surface and orthogonal to the first scanning axis of the sample surface and maintaining the probe in close proximity to the sample to cause the probe to move relatively in the direction of a third scanning axis orthogonal to both the first scanning axis and the second scanning axis so as to follow undulations on the sample surface; scanning control means for controlling relative raster scanning of the probe with respect to the sample; and displacement detection means for measuring relative position and displacement of the probe relative to the sample by measuring displacement of the scanning means in the direction of the second scanning axis or the third scanning axis and outputting a feedback signal based on the detected position and displacement, the feedback signal being used for controlling the probe position; wherein the scanning control means receives the feedback signal and performs feedback control by controlling the prove position in accordance therewith such that the relative position or displacement of the probe with respect to the sample in the direction of the scanning axis having the lower scanning frequency of the first scanning axis and the second scanning axis becomes constant during either an entire period or a portion of a period of scanning in the direction of the other scanning axis having the higher scanning frequency, and the scanning control means includes scanning speed adjustment means for adjusting the speed of the raster scanning in the direction of one of the first and second scanning axes, and sampling pulse generating means for generating sampling pulses at predetermined times.

2. A scanning probe microscope according to claim 1; wherein the displacement detection means simultaneously detects the relative position or displacement of the probe with respect to the sample in the direction of the first scanning axis, the second scanning axis and the third scanning axis; and further comprising a storage device for storing detection results of the displacement detection means; and a computer for generating an observation image of the sample surface based on the relative position or displacement of the probe with respect to the sample for each of the scanning axes saved in the storage device.

3. A scanning probe microscope according to claim 1; wherein the scanning control means receives the feedback signal and performs feedback control by controlling the probe position in accordance therewith such that the relative position and displacement of the probe with respect to the sample in the direction of the scanning axis having the lower scanning frequency of the first scanning axis and the second scanning axis becomes constant during one half period of scanning in the direction of the other scanning axis having the higher scanning frequency.

4. A scanning probe microscope according to claim 2; wherein the scanning control means performs raster scanning control such that a scanning range of the sample surface in a direction of at least one of the first scanning axis and the second scanning axis is larger than and includes a range of the sample surface being observed.

5. A scanning probe microscope according to 4; wherein the scanning control means performs raster scanning control such that a scanning range of the sample surface in a direction of the scanning axis having the higher scanning frequency of the first scanning axis and the second scanning axis is larger than and includes a range of the sample surface being observed.

6. A scanning probe microscope according to claim 5; wherein the displacement detection means commences sampling and storage of relative position and displacement values of the probe relative to the sample in a direction of the first scanning axis, the second scanning axis and the third scanning axis at a predetermined sampling period, at the time the relative position and displacement of the probe with respect to the sample in a direction of the scanning axis having the higher scanning frequency of the first scanning axis and the second scanning axis enter a range being observed.

7. A scanning probe microscope according to claim 5; wherein the displacement detection means commences sampling and storage of relative position or displacement values of the probe relative to the sample in a direction of the first scanning axis, the second scanning axis and the third scanning axis at a predetermined sampling period at a point in time when the rate of change over time of the relative position or displacement of the probe with respect to the sample in a direction of the scanning axis having the higher scanning high frequency of the first scanning axis and the second scanning axis becomes constant or becomes a predetermined value.

8. A scanning probe microscope according to claim 5; wherein the displacement detection means commences sampling and storage of relative position or displacement values of the probe relative to the sample in a direction of the first scanning axis, the second scanning axis and the third scanning axis at a predetermined scanning period at a point in time when two conditions occur, the first condition occurring when the relative position or displacement of the probe with respect to the sample in a direction of the scanning axis having the higher scanning frequency of the first scanning axis and the second scanning axis enters a range being observed, and the second condition occurring when the rate of change over time of the relative position of displacement of the probe with respect to the sample in a direction of the scanning axis having the higher scanning frequency becomes constant or becomes a predetermined value.

9. A scanning probe microscope which observes microscopic structures on a sample surface, comprising: a probe responsive to an atomic force generated when brought into close proximity to the sample surface; scanning means for performing raster scanning of the probe along a first scanning axis substantially parallel to the sample surface and a second scanning axis substantially parallel to the sample surface and orthogonal to the first scanning axis of the sample surface and maintaining the probe in close proximity to the sample to cause the probe to move relatively in the direction of a third scanning axis orthogonal to both the first scanning axis and the second scanning axis so as to follow undulations on the sample surface; scanning control means for controlling relative raster scanning of the probe with respect to the sample; displacement detection means for measuring relative position and displacement of the probe relative to the sample by measuring displacement of the scanning means in the direction of the second scanning axis or the third scanning axis and outputting a feedback signal based on the detected position and displacement, the feedback signal being used for controlling the probe position; a storage device for storing detection results of the displacement detection means; and a computer for generating an observation image of the sample surface based on the relative position or displacement of the probe with respect to the sample for each of the scanning axes saved in the storage device; wherein the displacement detection means simultaneously detects the relative position or displacement of the probe with respect to the sample in the direction of the first scanning axis, the second scanning axis and the third scanning axis; wherein the scanning control means performs raster scanning control such that a scanning range of the sample surface in a direction of the scanning axis having the higher scanning frequency of the first scanning axis and the second scanning axis is larger than and includes a range of the sample surface being observed; wherein the displacement detection means commences sampling and storage of relative position and displacement values of the probe relative to the sample in a direction of the first scanning axis, the second scanning axis and the third scanning axis at a predetermined sampling period, at the time the relative position and displacement of the probe with respect to the sample in a direction of the scanning axis having the higher scanning frequency of the first scanning axis and the second scanning axis enter a range being observed; and wherein the scanning control means receives the feedback signal and performs feedback control in accordance therewith so that rate of change over time of the relative position and displacement of the probe with respect to the sample in the direction of a scanning axis having the higher scanning frequency of the first scanning axis and the second scanning axis of the raster scanning become a set value and remains at that value until the relative position and displacement of the probe with respect to the sample in the direction of the scanning axis having the higher scanning frequency enter a range being observed.

10. A scanning probe microscope which observes microscopic structures on a sample surface, comprising: a probe responsive to an atomic force generated when brought into close proximity to the sample surface; scanning means for performing raster scanning of the probe along a first scanning axis substantially parallel to the sample surface and a second scanning axis substantially parallel to the sample surface and orthogonal to the first scanning axis of the sample surface and maintaining the probe in close proximity to the sample to cause the probe to move relatively in the direction of a third scanning axis orthogonal to both the first scanning axis and the second scanning axis so as to follow undulations on the sample surface; scanning control means for controlling relative raster scanning of the probe with respect to the sample; displacement detection means for measuring relative position and displacement of the probe relative to the sample by measuring displacement of the scanning means in the direction of the second scanning axis or the third scanning axis and outputting a feedback signal based on the detected position and displacement, the feedback signal being used for controlling the probe position; and a storage device for storing detection results of the displacement detection means; and a computer for generating an observation image of the sample surface based on the relative position or displacement of the probe with respect to the sample for each of the scanning axes saved in the storage device;

wherein the displacement detection means simultaneously detects the relative position or displacement of the probe with respect to the sample in the direction of the first scanning axis, the second scanning axis and the third scanning axis;

wherein the scanning control means performs raster scanning control such that a scanning range of the sample surface in a direction of the scanning axis having the higher scanning frequency of the first scanning axis and the second scanning axis is larger than and includes a range of the sample surface being observed;

wherein the displacement detection means commences sampling and storage of relative position and displacement values of the probe relative to the sample in a direction of the first scanning axis, the second scanning axis and the third scanning axis at a predetermined sampling period, at the time the relative position and displacement of the probe with respect to the sample in a direction of the scanning axis having the higher scanning frequency of the first scanning axis and the second scanning axis enter a range being observed; and wherein the scanning control means receives the feedback signal and controls an amount of displacement of the probe in a direction of the scanning axis having the higher scanning frequency to be larger than a region to be observed so that rate of change over time of the relative position and displacement of the probe with respect to the sample in the direction of the scanning axis having the higher scanning frequency of the first scanning axis and the second scanning axis of the raster scanning become constant until the relative position and displacement of the probe with respect to the sample in the direction of the scanning axis having the higher scanning frequency enter a range being observed.

11. A scanning probe microscope according to claim 1; wherein the scanning speed adjustment means adjusts the relative speed of the probe with respect to the sample in the direction of the scanning axis having the higher high scanning frequency of the first scanning axis and the second scanning axis of the raster scanning so that a control error in the direction of the third scanning axis is minimized.

12. A scanning probe microscope according to claim 1; wherein the scanning speed adjustment means keeps constant the relative position or displacement of the probe with respect to the sample in the direction of the scanning axis having the lower scanning frequency of the first scanning axis and the second scanning axis of the raster scanning.

13. A scanning probe microscope according to claim 1; wherein the scanning speed adjustment means adjusts the relative speed of the probe with respect to the sample in the direction of the scanning axis having the higher scanning frequency of the first scanning axis and the second scanning axis of the raster scanning so that an absolute value of a control error in the direction of the third scanning axis is minimized.

14. A probe scanning microscope according to claim 13; wherein the sampling pulse generating means generates a sampling pulse every time the relative position or displacement of the probe with respect to the sample in the direction of the scanning axis having the higher frequency of the first scanning axis and the second scanning axis of the raster scanning become a predetermined value.

15. A scanning probe microscope according to claim 1; wherein the scanning means comprises an XYZ translator for receiving an output voltage of the scanning control means and controlling the position of the probe in accordance therewith.

16. A scanning probe microscope according to claim 15; wherein the scanning control means controls a voltage applied to the XYZ translator in order to cause raster scanning of the probe relatively across the sample surface.

17. A scanning probe microscope according to claim 15; wherein the XYZ translator comprises a piezoelectric element displaceable in the direction of the three scanning axes.

18. A scanning probe microscope according to claim 1; wherein the probe is a cantilever probe.

19. A scanning probe microscope according to claim 18; further comprising a deflection detector for detecting deflection of the cantilever probe during scanning movement of the probe across the sample surface.

20. A scanning probe microscope according to claim 19; further comprising a computer for producing an image of the sample surface in accordance with outputs of the displacement detection means and the deflection detector.

21. A scanning probe microscope according to claim 1; wherein the scanning control means performs raster scanning control so that a scanning range of the sample in the direction of the scanning axis having the higher scanning frequency is larger than and includes a range of the sample surface being observed.

22. A scanning probe microscope comprising: a probe; an XYZ translator for causing the probe to undergo relative scanning movement with respect to a sample surface along first and second orthogonal axes substantially parallel to a sample surface to cause the probe to undergo movement along a third axis orthogonal to the first and second axes in response to undulations on the sample surface, displacement of the probe in the third axis being used to produce an image of the sample surface, and a scanning speed of the probe relative to the sample being lower along the second axis than along the first axis; a displacement detector for detecting displacement of the XYZ translator in the direction of the second axis and outputting a feedback signal in accordance therewith for controlling the relative position of the probe with respect to the sample surface along the second axis; and scanning control means for controlling the XYZ translator in accordance with the feedback signal to maintain the probe position constant along the second axis during either an entire period or a portion of a period of scanning along the first axis; wherein the scanning control means comprises scanning speed adjustment means for adjusting the speed of the scanning in the direction of the first axis so that a control error in the direction of the third axis is minimized, and sampling pulse generating means for generating sampling pulses for sampling the position of the probe at predetermined times.

23. A scanning probe microscope according to claim 22; wherein the scanning control means controls the XYZ translator to scan the probe along the first axis in a range that is larger than a range of the sample surface that is intended to be observed.

24. A scanning probe microscope according to claim 23; wherein the displacement detector commences sampling of probe displacement values when the position of the probe in the direction of the first axis enters the range intended to be observed.

25. A scanning probe microscope according to claim 22; wherein the scanning speed adjustment means maintains the probe position constant in the direction of the axis having the lower scanning frequency of the first and second scanning axes.

26. A scanning probe microscope according to claim 22; wherein the scanning speed adjustment means adjusts the relative speed of the probe in the direction of the axis having the higher scanning frequency of the first and second axes so that an absolute value of a control error in the direction of the third axis is minimized.

27. A probe scanning microscope according to claim 26; wherein the sampling pulse generating means generates a sampling pulse every time the probe position in the direction of the axis having the higher scanning frequency becomes a predetermined value.

* * * * *